United States Patent [19]

Funahashi et al.

[11] Patent Number: 4,848,096
[45] Date of Patent: Jul. 18, 1989

[54] APPARATUS WITH METHOD AND MEANS FOR DIAGNOSING FAILURE OF A PRESSURE SENSOR

[75] Inventors: Nobuhiro Funahashi; Toshio Yamashita, both of Nishikasugai, Japan

[73] Assignee: Mitsubishi Jukogyo K.K., Aichi, Japan

[21] Appl. No.: 84,955

[22] Filed: Aug. 13, 1987

[51] Int. Cl.$^4$ .............................. F25B 49/00
[52] U.S. Cl. .............................. 62/126; 62/129; 62/228.3
[58] Field of Search ............ 62/125, 126, 127, 129, 62/228.3; 73/4 R; 364/558, 571

[56] References Cited

U.S. PATENT DOCUMENTS

| | | | |
|---|---|---|---|
| 4,106,306 | 8/1978 | Saunders | 62/149 |
| 4,122,720 | 10/1978 | Podl | 364/511 X |
| 4,337,516 | 6/1982 | Murphy et al. | 364/551 |
| 4,381,549 | 4/1983 | Stamp, Jr. et al. | 165/11.1 X |
| 4,602,484 | 7/1986 | Bendikson | 62/228.3 X |
| 4,653,280 | 3/1987 | Hansen et al. | 62/158 X |

FOREIGN PATENT DOCUMENTS

112976  5/1987  Japan .

*Primary Examiner*—Harry B. Tanner
*Attorney, Agent, or Firm*—Stanger, Michaelson, Reynolds Spivak & Tobia

[57] ABSTRACT

A refrigeration systems diagnoses its pressure sensors by turning the system off, determining whether the pressure sensors on the high-pressure-side and on the low-pressure-side of a refrigeration circuit detect unvarying pressures, and comparing the pressure values detected by a high pressure sensor and a low pressure sensor with each other. The high pressure sensor or the low pressure sensor is regarded as defective when the difference between the two pressures detected falls outside a tolerance range. In one embodiment an analyzer compares the pressures to produce a signal indicating failure when the pressure difference falls outside the tolerance range.

20 Claims, 6 Drawing Sheets

APPARATUS WITH METHOD AND MEANS FOR DIAGNOSING FAILURE OF A PRESSURE SENSOR

FIELD OF THE INVENTION AND RELATED ART STATEMENT

The present invention relates to apparatuses with diagnostic arrangements for pressure sensing devices and particularly to failure diagnosing methods and means for determining failure of pressure sensors which detect the refrigerant pressure in a refrigeration unit.

Heretofore, an operator determined whether a pressure detection sensor used in a refrigeration unit was in good working order either by disconnecting the pressure sensor from the refrigeration unit and calibrating it against a device such as a standard pressure generator, or by connecting another correct pressure gauge to the refrigeration unit and comparing the values of the pressure detected by both meters.

However, such methods and means create problems of wasted time, labor, and cost. For example, in addition to the extensive time required to disconnect and reconnect the sensor or the pressure gauge and to judge the condition of the sensor, the refrigerant in the refrigeration unit sometimes leaks out during the disconnect or reconnect procedures, or the refrigerant has to be discarded. When a discharge of the refrigerant occurs, it may become necessary to add a charge of the refrigerant or to perform a vacuum pumping operation and to recharge the refrigerant. Other difficulties also arise.

OBJECTS AND SUMMARY OF THE INVENTION

An object of the present invention is to provide methods and means which permit an automatic diagnosis of the working order of pressure sensors without disconnecting the pressure sensor or connecting a pressure gauge.

Another object of the present invention is to provide methods and means which enable one to substantially reduce the time, labor and cost for judging the working order of a pressure sensor.

DETAILED DESCRIPTION OF PREFERRED EMBODIMENTS

The present invention will be described on the basis of the following embodiments.

Figure 1:
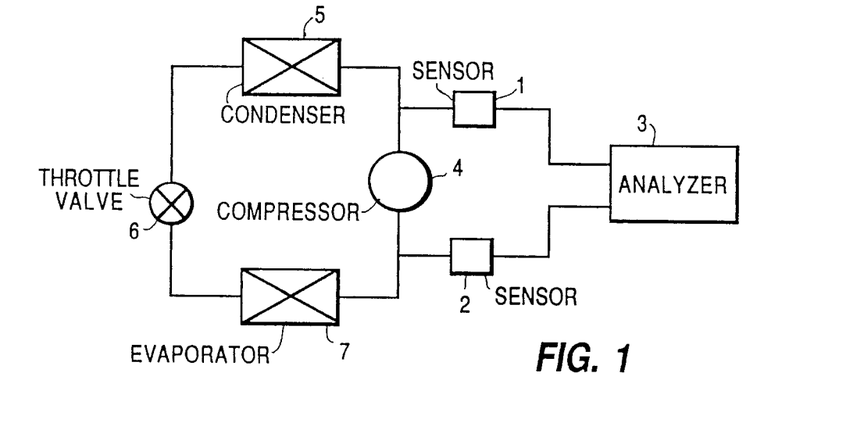
FIG. 1 is a block diagram which shows an embodiment of the present invention.

In the embodiment of FIG. 1, a refrigeration circuit of a refrigeration unit includes a high-pressure-side pressure sensor 1 and a low-pressure-side pressure sensor 2, and a working order judging means or analyzer 3 connected to each of the pressure sensors 1 and 2 for comparing the detected pressures and for judging (i.e. determining) whether the pressure sensors 1 and 2 are in good working order. The refrigeration circuit is formed by connecting a compressor 4, a condenser 5, a throttle valve 6, and an evaporator 7 in that order. During the operation of the refrigeration unit, the discharge side of the compressor 4, namely, the side adjacent the pressure sensor 1, produces high pressure and the suction side of the compressor 4, namely, the side adjacent the pressure sensor 2, produces low pressure. During a halt in the operation of the refrigeration unit, that is, when the compressor 4 is not operating, the high-pressure-side and the low-pressure-side automatically balance via the throttle valve 6 to a pressure that corresponds to the ambient temperature of the refrigeration unit so as to exhibit a uniform pressure within and throughout the refrigeration circuit.

Figure 2:
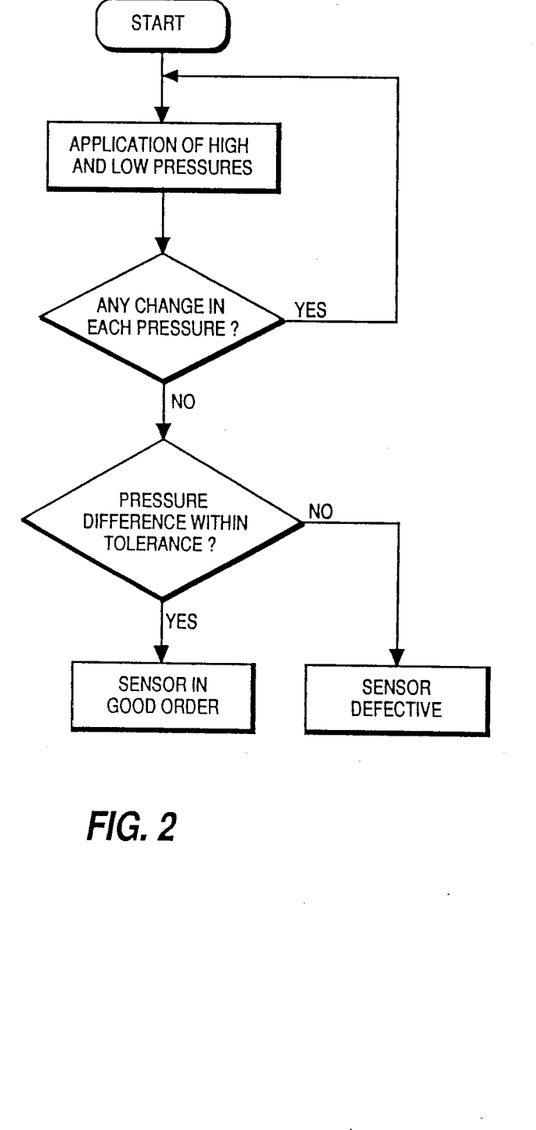
FIG. 2 is a flow chart for diagnosing the working condition of pressure sensors.

FIG. 2 shows a flow chart for diagnosing whether the pressure sensors 1 and 2 are in good working order. The diagnosis starts when the compressor 4 is at a halt, such as before the start of the operation of the refrigeration unit or after the stoppage of the operation of the refrigeration unit, and diagnoses whether the pressure sensors 1 and 2 are in good working order.

Specifically, the time for detecting the pressure values on the high-pressure-side and the low-pressure-side of the refrigeration circuit may be chosen immediately prior to the start of the operation of the refrigeration unit; may be chosen at any time after the elapse of a period which is set based on the time required for pressure equalization that is determined beforehand by a test, a calculation, or the like, after the stoppage of the operation of the refrigeration unit; or may be chosen at any time after the pressure on the high-pressure-side and the pressure on the low-pressure-side are detected and the temporal variations in both of the detected values have disappeared after the stoppage of the operation of the refrigeration unit.

Following the start of the diagnosis, in order to judge whether the pressure within the refrigeration circuit is in an equalized state, first, the pressures detected by the high-pressure-side pressure sensor 1 and the low-pressure-side pressure sensor 2 are applied to the working order judging means or analyzer 3. If no temporal variations are observed in each of the detected pressures then the system proceeds to the next step for diagnosing whether the pressure sensors are in good working order by regarding that the pressure within the refrigeration circuit is equalized. On the other hand, if there are seen some temporal variations in the detected pressures, one has to wait until temporal variations are no longer observed in the respective detected pressures.

When the refrigeration circuit is found to be in a state of equalized pressure, the pressures detected by the high-sensor 1 and the low-pressure-side pressure sensor 2 are compared by the working order judging means 3. If the difference between the two detected pressures lies within a tolerance range, the pressure sensors 1 and 2 are judged to be in good working order, whereas if the difference falls outside the tolerance range, either one is judged to be defective. Since it seldom happens that both of the pressure sensors become simultaneously defective, the method and means above will make it possible to accurately detect a case in which the pressure sensor 1 or 2 is defective.

Figure 3:
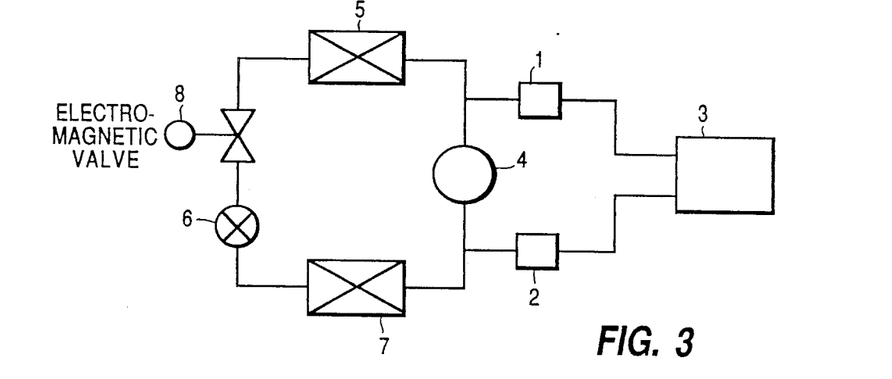
FIG. 3 is a block diagram which shows another embodiment of the present invention.

It should be mentioned that in a unit which has an electromagnetic valve 8 in the refrigeration circuit, as shown in FIG. 3, and closes the electromagnetic valve 8 when the refrigeration unit is halted, it is only necessary to apply the diagnostic flow described in the above, after equalizing the pressures on the high-pressure-side and on the low-pressure-side of the refrigeration circuit by opening the electromagnetic valve 8 at the time of diagnosing the pressure sensors.

In addition, after stoppage of the operation, it is possible to compare the pressure values detected by the high-pressure-side sensor 1 and the low-pressure-side sensor 2 after elapse of a predetermined duration required for pressure equalization, regardless of the temporal variations in the detected outputs as in the above.

As presented in the foregoing, according to the present invention, the judging of whether the pressure sensors are in good working order can be carried out by an automatic diagnosis, without making use of other means and with the pressure sensors kept intact on the refrigeration unit. Namely, according to the present invention, it is possible to carry out a determination of whether the pressure sensors are in good working order by mutually checking of the high-pressure-side pressure sensor 1 and the low-pressure-side pressure sensor 2, without disconnecting the pressure sensors 1 or 2 or connecting a pressure gauge. Accordingly, a sharp reduction can be realized in the time, labor and cost for judging whether a pressure sensor is in good working order. Moreover, an automatic failure diagnosis of the refrigeration unit can be carried out by the incorporation of the present method in the control of the unit.

According to an embodiment of the invention, the analyzer 3 includes a micro-processor which performs the steps shown by the flow diagram of FIG. 2 and also includes an indicator that responds to a "Sensor Defective" condition by indicating this condition either in the form of an audible or visual alarm. According to another embodiment the microprocessor also generates a feedback signal to disable the system in the event of a defective sensor.

Figure 4:
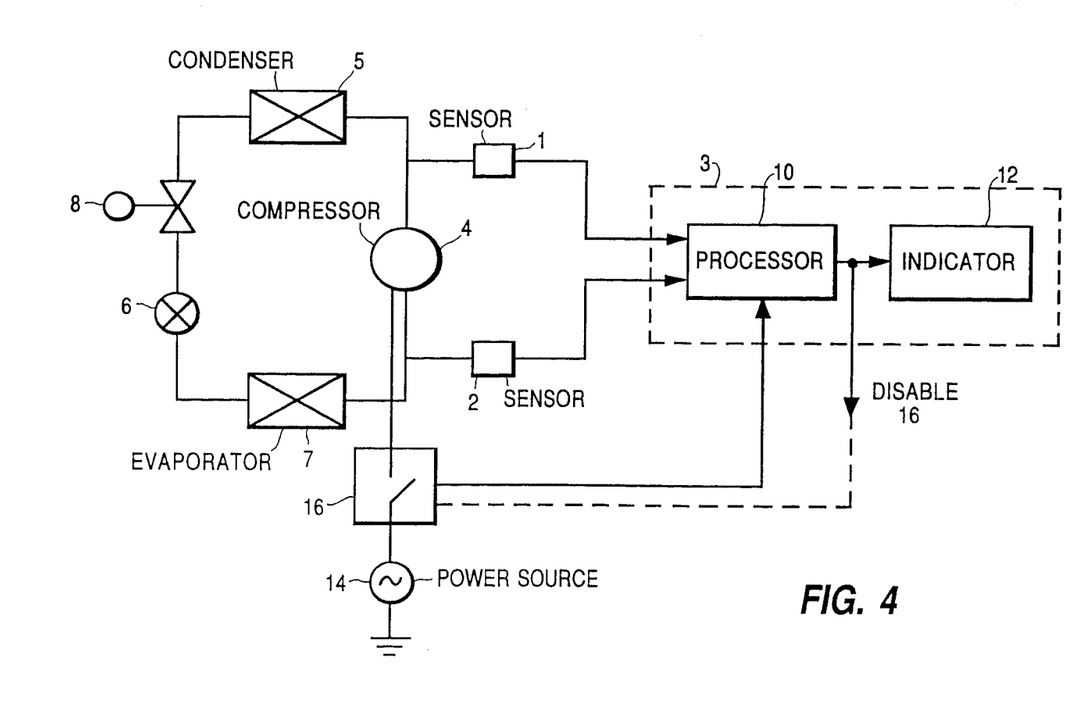
FIG. 4 is a block diagram of yet another embodiment of the invention.

Yet another embodiment of the invention appears in FIG. 4. Here, the members correspond to that of FIG. 3 with a micro-processor or processor 10 and an indicator 12 forming the analyzer 3. FIG. 4 also shows a power source 14 energizing the compressor 4 through a switch 16. The processor 10 senses the on or off condition of the switch 16 as part of its operation.

Figure 5:
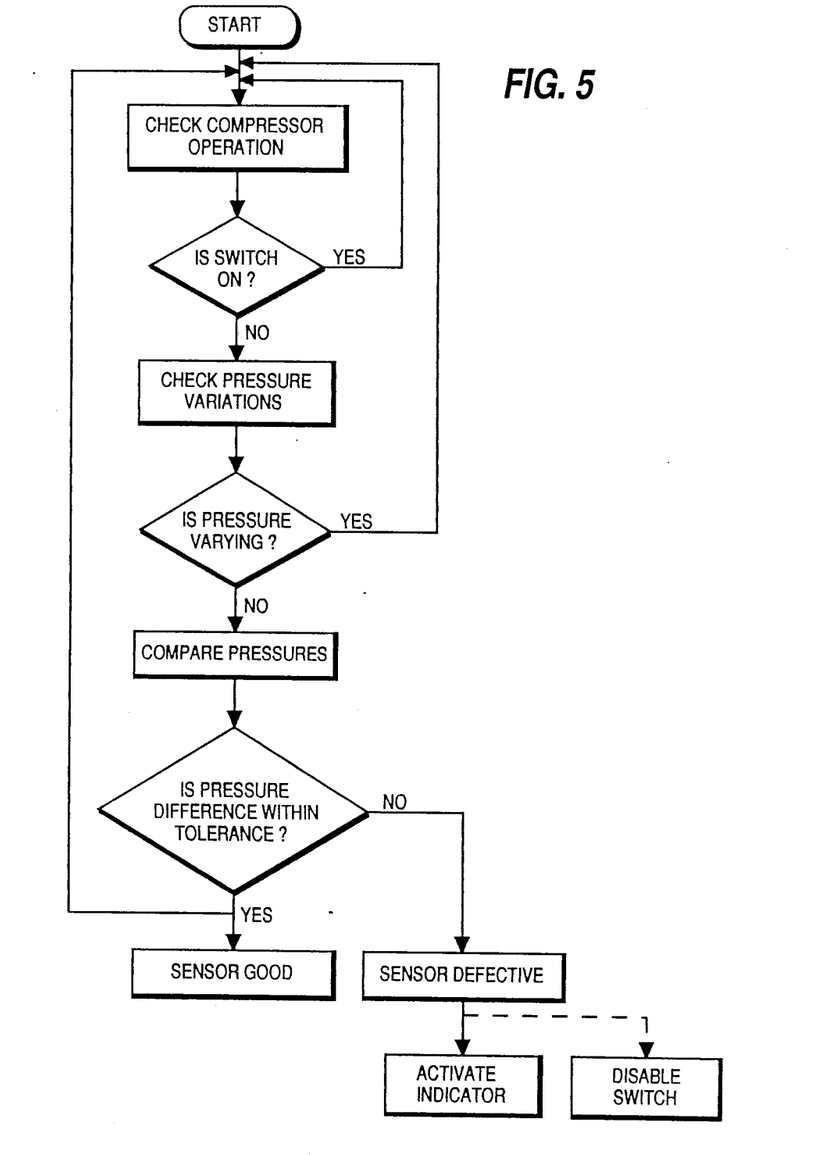
FIG. 5 is a flow chart showing the operation of the structure in FIG. 4.

The processor 10 in FIG. 4 performs the steps shown in the flow diagram of FIG. 5. Here, the processor 10 first checks the compressor operation by sensing the on or off condition. That is, the processor determines whether the compressor is on. If the compressor is on, the refrigeration unit composed of elements 5, 6, 7, and 8 is operating and the processor returns to the start position as shown by the arrow emerging from the point YES in the flow. If the compressor 4 is not on, the pressures are at, or are approaching equality throughout the circuit and the processor 10 can check the pressure variations in the separate sensors 1 and 2. It then asks the question of whether the pressure is varying. If the answer is YES, the processor 10 starts again by checking whether the compressor 4 is on. If the answer is NO, the existing conditions are such that the pressures in the unit composed of the members 5, 6, 7, and 8 are equal and unvarying.

Thereafter, the processor 10 compares the pressures at the sensors 1 and 2 and asks the question if the pressure difference is within a predetermine tolerance. If the answer is YES, the sensors are regarded as good and the process is repeated. If the answer is NO, this indicates that the sensor is defective and the processor activates the indicator 12. In one embodiment the processor 10 produces a feedback signal, in response to a determination that a sensor 1 or 2 is defective, to disable the switch 16. However this signal is optional and need not be used.

Figure 6:
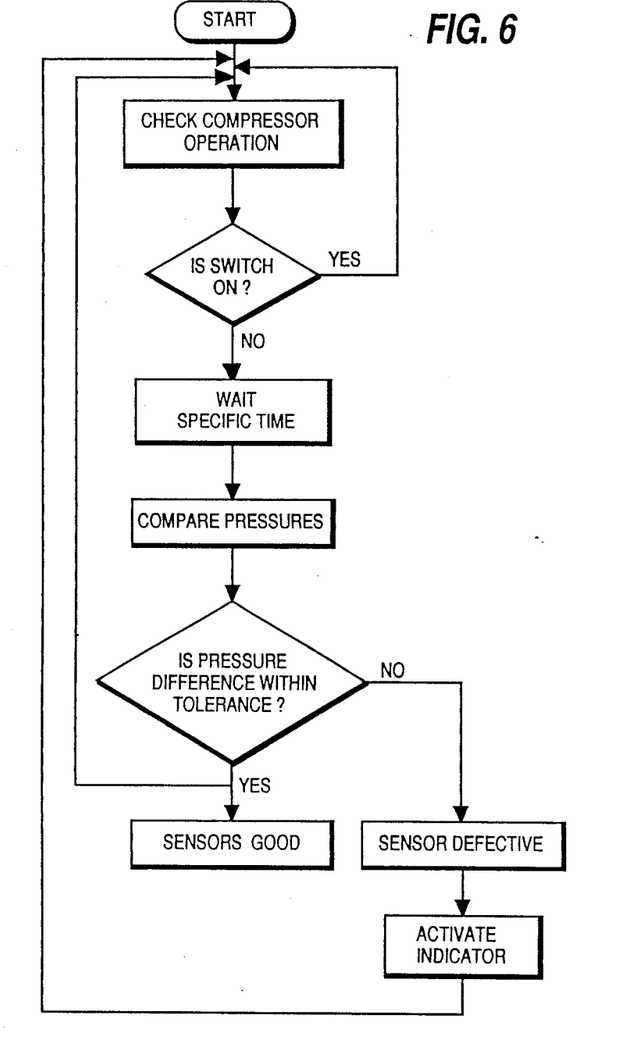
FIG. 6 is another flow chart showing another operation of the structure in FIG. 4.

According to another embodiment of the invention the processor 10 performs the functions illustrated in the flow chart of FIG. 6. Here, the processor 10 first checks the compressor 4 operation and asks the question of whether the power switch 16 is on. If YES, the analyzer 3 restarts as shown in FIG. 6. If the switch 16 is off, the processor 10 waits a specific, i.e. predetermined, time to make sure that the pressures on each side of the compressor 4 have reached an equal value. Thereafter, the processor 10 compares the pressures measured by the sensors 1 and 2 and asks whether the pressure difference is within a predetermined tolerance. If the answer is YES, the sensors are reading the same value for equal pressure and the sensors are regarded as good, based upon the assumption that both sensors will not become defective simultaneously. The processor then restarts the entire operation. If the pressure difference is not within the predetermined tolerance, the sensor is regarded as defective and the processor actuates the indicator 12. In order to assure that the indicator remains actuated and that the defective condition is not merely a momentary error, the processor starts the procedure over again. The indicator has a sufficiently long duration time to remain activated from cycle to cycle. According to an embodiment, the indicator 12 is the type that remains in the "Sensor Defective" condition once set and must be reset manually.

According to another embodiment of the invention the processor 10 also restarts the entire operation after activating the indicator in FIG. 5.

Figure 7:
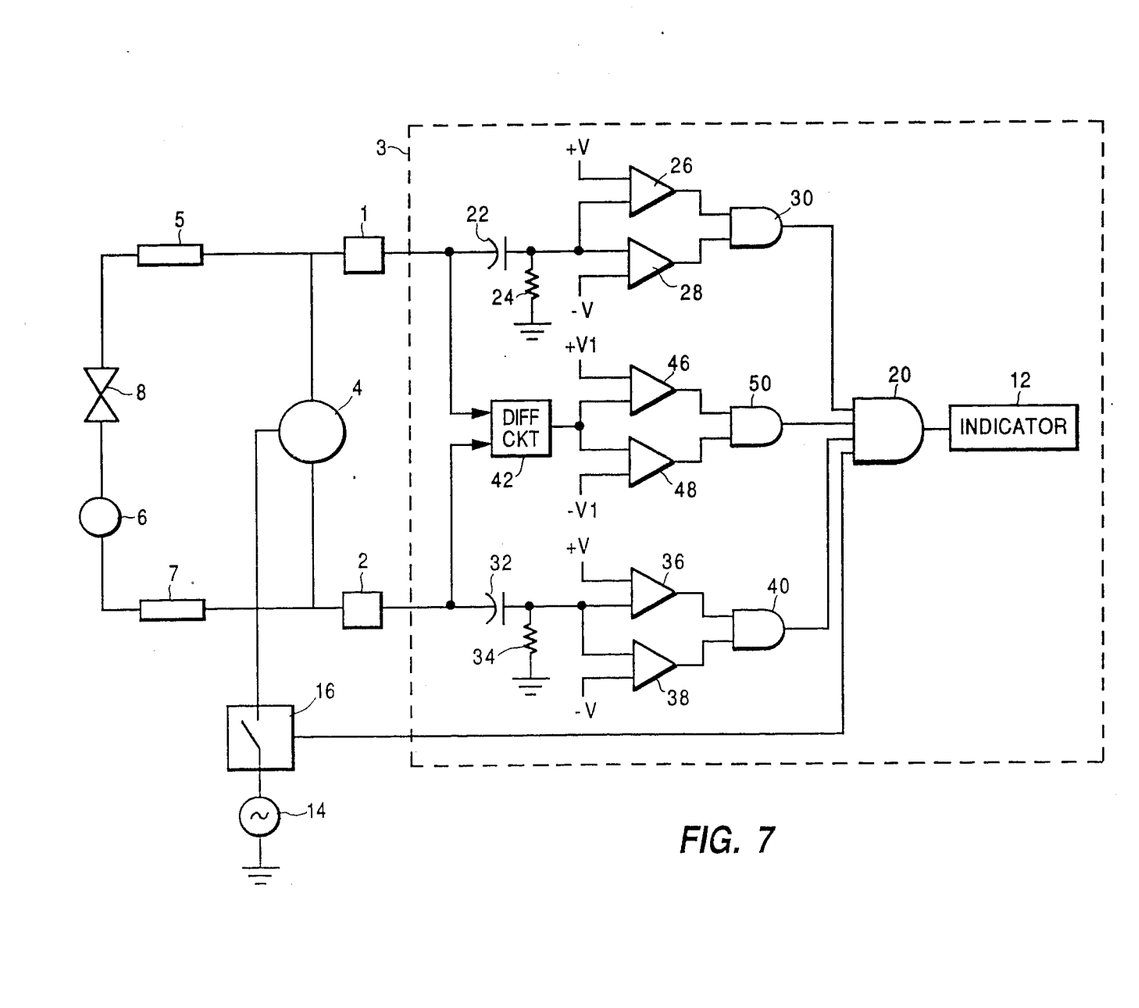
FIG. 7 is a block diagram of another system embodying the invention.

According to another embodiment of the invention, the analyzer 3 is composed of a circuit that performs the functions of the processor 10 and also includes the indicator 12. Here, the off condition of the switch 16 produces a high at AND gate 20. At the same time a differentiator composed of a capacitor 22 and a resistor 24 differentiates the output of the sensor 1 and produces a substantially zero voltage only if the pressure in the line emerging from compressor 4 is not varying.

Two comparators 26 and 28 which respond to reference voltages $+V$ and $-V$ established a window about a value zero between which the voltage at the output of the differentiator 22, 24 must fall in order for both comparators 26 and 28 to produce a positive voltage at the inputs of an AND gate 30. If the voltage of the differentiator is sufficiently small to pass through the voltage window of the comparators 26 and 28, and thereby indicate that the pressure in the line to the condenser 5 is not varying, then the comparators 26 and 28, which are bistable, switch to a high or 1 state. This turns on the AND gate 30 and applies a high to the AND gate 20.

Similarly, a differentiator composed of the capacitor 32 and resistor 34 cooperates with a pair of comparators 36 and 38 having respective reference voltages $+V$ and $-V$ to produce highs at the AND gate 40 if the pressure in the line from the evaporator 7 to the compressor 4 does not vary. The AND gate 40 then applies a high to the AND gate 20.

At the same time, a difference circuit 42 compares the voltage outputs of the voltage sensors 1 and 2. If the value of the difference between the two voltages is sufficiently high, that is they show a wide difference, a pair of comparators 46 and 48 having reference voltages +V1 and −V1 produce highs at an AND gate 50 which in turn produces a high at the input to the AND gate 20.

If the AND gates 30, 40, and 50 as well as the switch 16 all produce highs at the AND gate 50, the latter turns on the indicator 12. The high at the OFF switch 16 and the high at the AND gates 30 and 40 together denote that a the compressor is off and the pressures have stopped varying so that a difference measurement may be considered effective. At this time the existence of a high at the AND gate 50 shows that the pressure difference at sensors 1 and 2 is higher than the tolerance range. Hence the AND gate 20 now turns on the indicator 12.

If the sensors 1 and 2 indicate pressure variations outside the windows established by the comparators 26 and 28 and the comparators 36 and 38, a low appears at one of the AND gates 30 or 40. This produces a low at the AND gate 20 and precludes a difference measurements of sensors 1 and 2 from passing the AND gate 20. Likewise, a closed switch 16 produces a low which precludes a measurement at the gate 50 from passing the AND gate 20. Thus no pressure variations may exist, and the switch 16 must be off, for difference measurements at the circuit 42 and gate 50 to pass the AND gate 20.

If the difference circuit 42 indicates that the difference between the outputs of the sensors 1 and 2 is smaller than the window established by comparators 46 and 48, a low appears at one of the inputs to the AND gate 50, and hence at the input of the AND gate 20. If a low appears at any of the inputs to the AND gate 20, one of the three conditions necessary for operation of the indicator 12 does not occur. That is, the switch 16 may be on, the sensors 1 and 2 indicate variations in pressure in the lines entering and emerging from the compressor 4, or that the difference circuit 42 produces a value within the range of tolerance established by the comparators 46 and 48. This means either that a test is not being performed, or that the sensors 1 and 2 have proven to be in good condition.

On the other hand, highs at the outputs of the AND gates 30 and 40 and at the switch 16, hence at the corresponding three inputs of the AND gate 20, indicate that the switch 16 is off, that no variations exist in the pressure of the lines entering and emerging from the compressor 4. Accordingly the voltages at these corresponding inputs to the AND gate 20 indicate that a test is being conducted. If the voltage difference at the circuit 42 between the sensors 1 and 2 is sufficiently great to produce a high at the AND gate 50 the AND gate 20 now turns on and actuates the indicator 12 to signify that one of the sensors 1 or 2 is inoperative and not measuring pressure properly.

In any of the embodiments when the processor 10 furnishes a signal to the indicator 12 that a sensor is defective, the processor may also produce a feedback signal to disable the operation of the refrigeration unit until the defective sensor is replaced. For example the signal may disable to switch 16. Of course the disable signal may itself be eliminated if desired.

While embodiments of the invention have been described in detail it will be evident to those skilled in the art that the invention may be embodied otherwise.

We claim:

1. A refrigeration unit, comprising:
compressor means for compressing fluid and having an inlet side for receiving fluid and an outlet side for discharging compressed fluid from the compressor,
cooling means connecting the outlet side to said inlet side for performing a cooling function,
an inlet sensor on the inlet side and an outlet sensor on the outlet side
an analyzer for comparing the pressures sensed by said sensors and for producing a signal when the difference between the values compared is outside a predetermined tolerance and, simultaneously, the compressor means is off.

2. A unit as in claim 1, wherein said analyzer produces the signal only when the pressures on said inlet side and said outlet side are substantially unequal.

3. A unit as in claim 1, wherein said analyzer includes:
a processor for producing the signal, and
an indicator for producing an indication in response to said signal.

4. A unit as in claim 2, wherein said analyzer includes:
a processor for producing the signal, and
an indicator for producing an indication in response to said signal.

5. A unit as in claim 1, wherein said analyzer is coupled to said compressor means to further disable said compressor means in response to said signal.

6. A unit as in claim 2, wherein said analyzer is coupled to said compressor means to further disable said compressor means in response to said signal.

7. A unit as in claim 1, wherein
said compressor means includes a compressor and control means for indicating that said compressor is off, and
said analyzer includes response means for responding to said control means.

8. A unit as in claim 2, wherein
said compressor means includes a compressor and control means for indicating that said compressor is off, and
said analyzer includes response means for responding to said control means.

9. A unit as in claim 3, wherein
said compressor means includes a compressor and control means for indicating that said compressor is off, and
said analyzer includes response means for responding to said control means.

10. A unit as in claim 1, wherein said analyzer includes detecting means for detecting variations in the pressures sensed by each one of said sensing means and producing said signal only when the variations do not exceed a predetermined value.

11. A unit as in claim 2, wherein said analyzer includes detecting means for detecting variations in the pressures sensed by each one of said sensing means and producing said signal only when the variations do not exceed a predetermined value.

12. A unit as in claim 3, wherein said analyzer includes detecting means for detecting variations in the pressures sensed by each one of said sensing means and producing said signal only when the variations do not exceed a predetermined value.

13. A unit as in claim 5, wherein said analyzer includes detecting means for detecting variations in the pressures sensed by each one of said sensing means and producing said signal only when the variations do not exceed a predetermined value.

14. A unit as in claim 7, wherein said analyzer includes detecting means for detecting variations in the pressures sensed by each one of said sensing means and producing said signal only when the variations do not exceed a predetermined value.

15. In a refrigeration unit having a refrigeration system with a high pressure portion and a low pressure portion, and with the high pressure portion and low pressure portion each having a pressure sensor, said system being pressurized and depressurized at different times, the method of diagnosing the operation of the sensors in the high pressure portion and the low pressure portion, comprising the steps of:

determining whether the system is pressurized or depressurized;

simultaneously measuring the pressures in each of the high pressure portion and the low pressure portion with said sensors;

comparing the pressures measured by each of said sensor with each other;

establishing whether the difference between the compared pressures exceeds a tolerance; and producing a failure signal when the difference between the values compared is outside a predetermined tolerance and, simultaneously, the system is depressurized.

16. The method as in claim 15, wherein the pressures are compared immediately prior to start of operation of the refrigeration system.

17. The method as in claim 15, wherein the failure signal is disabled until elapse of a predetermined period after the refrigeration system is depressurized.

18. The method as in claim 15, wherein the variation in pressure is sensed in each sensor when the refrigeration system is depressurized, and a failure signal is produced only after pressure variations in said sensors have disappeared.

19. The method as in claim 15, wherein the refrigeration system includes a compressor and a high pressure line with one of the sensors in the high pressure line as well as a low pressure line with the other of said sensors in the low pressure line, and wherein the compressor is turned off to depressurized the refrigeration system.

20. The method as in claim 15, wherein the failure signal operates an indicator.

* * * * *